H. H. WELSH & J. C. SCHWENCK.
Horse Hay-Fork.

No. 210,174. Patented Nov. 19, 1878.

Witnesses:
Fred. G. Dieterich
George Binkenburg

Inventors
Henry Harrison Welsh
John Charles Schwenck
by A. Peterson & Co.
their attorneys

N. PETERS, PHOTO-LITHOGRAPHER, WASHINGTON, D. C.

UNITED STATES PATENT OFFICE.

HENRY H. WELSH AND JOHN C. SCHWENCK, OF NEVADA, OHIO.

IMPROVEMENT IN HORSE HAY-FORKS.

Specification forming part of Letters Patent No. 210,174, dated November 19, 1878; application filed October 14, 1878.

*To all whom it may concern:*

Be it known that we, H. H. WELSH and J. C. SCHWENCK, of Nevada, in the county of Wyandot and State of Ohio, have invented certain new and useful Improvements in Horse Hay-Forks; and we do hereby declare that the following is a full, clear, and exact description thereof, which will enable others skilled in the art to which it appertains to make and use the same, reference being had to the accompanying drawings, which form a part of this specification, and in which—

Figure 1:
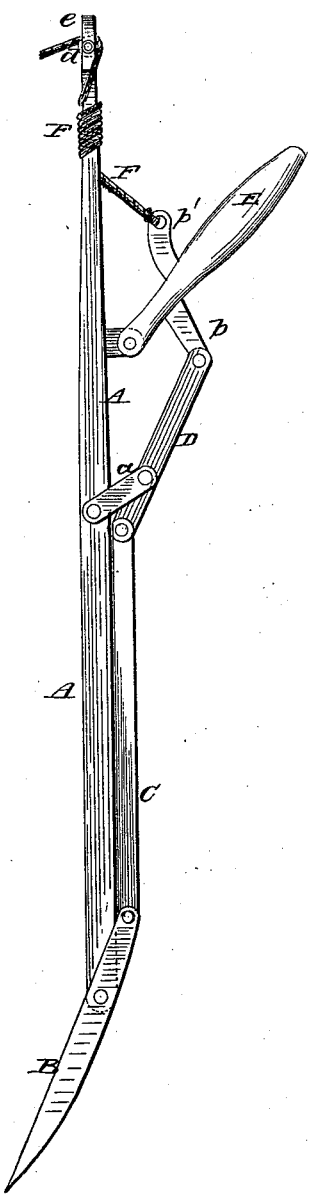
Figure 2:
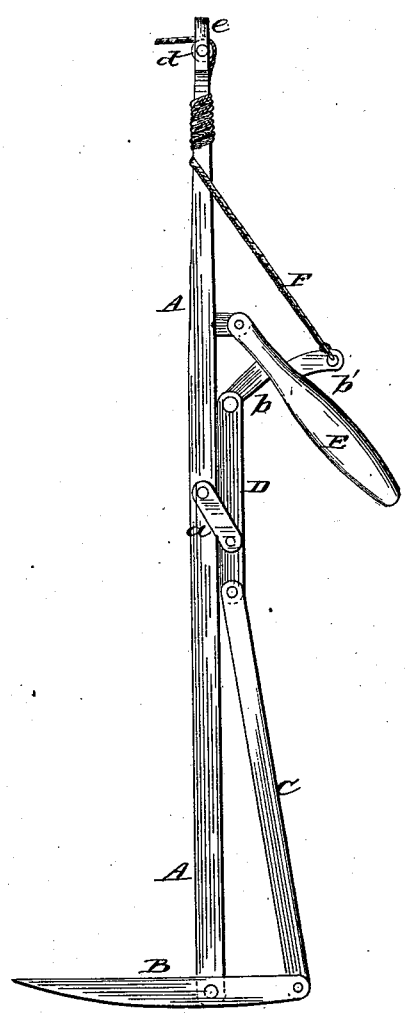

Figure 1 is a side elevation of our improved horse hay-fork in position for thrusting into the hay, and Fig. 2 is a similar elevation with the fork in position for lifting the hay.

The same part in the two figures is denoted by the same letter.

This invention appertains to certain improvements in horse hay-forks, by which simplicity of construction, ease of operation or manipulation, and certainty of the engagement of the fork with the hay to elevate it are obtained; and it consists in the fulcruming of the tine at a point between its point and heel to the lower end of an upright or bar, with intermediate mechanism between a lever or bar pivoted to its heel and the tripping-rope of the tine for locking the tine in about a horizontal position, substantially as hereinafter more fully set forth.

In the drawing, A refers to the upright or bar, to the lower end of which the tine B is fulcrumed at a point between its point and heel, the tine B being bifurcated at its rear end or heel to receive the said end of bar A, by which the tine can be swung from a vertical to a horizontal position to take up the hay. C is a bar or lever pivoted to the heel of the tine B and extending upward, connecting with a second lever, D, connected to the upright A by the pivoted jaws or links a, and to one arm, b, of the weighted lever E, pivoted to the upright A. To the other arm, b', of the lever E is fastened the rope F, which passes over a roller or sheave, d, hung in an eye, e, formed upon the upper end of the upright A.

The operation is as follows: The tine standing in a line with the upright A, or thereabout, the fork is thrust into the hay, in which position the tine will be held until its point has reached the required depth, when the lever E is depressed, by which the tine will be brought into a horizontal position to support the hay as the fork is elevated. Simultaneous with this movement of the lever E and tine its arm b, with the lever D and links or jaws a, will lock the tine in such position, and thus require no other force for that purpose and no further pressure upon the lever E. The fork is now elevated with its load, which is dumped, when the fork has reached the desired point of elevation, by drawing or pulling on the rope F, tripping the lever E, and allowing the tine to fall and empty the load.

The ends aimed at in the getting up of this fork are to take up hay, long or short, in any condition whatever, with certainty of locking the tine, and in any quantities, which have been accomplished.

This fork is also extremely simple, easily and cheaply constructed, the very lightest metal being adapted almost from which to make it, and can be operated with facility.

Having thus described our invention, we claim and desire to secure by Letters Patent of the United States—

In a horse hay-fork, the combination, with the movable upright A and tine B, of the lever C, jaws a, lever D, and armed lever E, substantially as and for the purpose set forth.

In testimony that we claim the foregoing as our own we have hereto affixed our signatures in presence of two witnesses.

HENRY HARISSON WELSH.
JOHN CHARLES SCHWENCK.

Witnesses:
E. F. ELLIOTT,
W. B. WOOLSEY.